US008103309B2

(12) United States Patent
Lee

(10) Patent No.: US 8,103,309 B2
(45) Date of Patent: Jan. 24, 2012

(54) MULTIMODE MOBILE TERMINAL AND SELF-SIM CONFIGURATION METHOD THEREOF

(75) Inventor: Ki Yong Lee, Suwon-si (KR)

(73) Assignee: Samsung Electronics Co., Ltd, Suwon-si (KR)

( * ) Notice: Subject to any disclaimer, the term of this patent is extended or adjusted under 35 U.S.C. 154(b) by 364 days.

(21) Appl. No.: 12/252,685

(22) Filed: Oct. 16, 2008

(65) Prior Publication Data

US 2009/0104939 A1 Apr. 23, 2009

(30) Foreign Application Priority Data

Oct. 19, 2007 (KR) ........................ 10-2007-0105376

(51) Int. Cl.
*H04B 1/38* (2006.01)

(52) U.S. Cl. ..................... 455/558; 455/411; 455/552.1; 726/20; 379/433.09

(58) Field of Classification Search ............... 455/127.4, 455/403, 410, 411, 418, 420, 435.1, 550.1, 455/551, 552.1, 553.1, 556.1, 556.2, 557, 455/558; 235/380, 472.01; 380/247, 249, 380/270, 277; 713/168–176, 182, 184, 185; 726/4, 5, 9, 16–21, 27, 28; 379/433.01, 433.09
See application file for complete search history.

(56) References Cited

U.S. PATENT DOCUMENTS

| | | | | |
|---|---|---|---|---|
| 5,907,804 A * | 5/1999 | Schroderus et al. | ........... | 455/411 |
| 6,119,020 A * | 9/2000 | Miller et al. | ................... | 455/558 |
| 6,125,283 A * | 9/2000 | Kolev et al. | ................ | 455/552.1 |
| 6,185,436 B1 * | 2/2001 | Vu | ................................. | 455/558 |
| 6,212,372 B1 * | 4/2001 | Julin | ............................ | 455/418 |
| 6,366,777 B1 * | 4/2002 | Uusitalo | ....................... | 455/433 |
| 7,280,847 B2 * | 10/2007 | Goldthwaite et al. | ........ | 455/558 |
| 7,350,713 B2 * | 4/2008 | Saito et al. | ............... | 235/472.01 |
| 7,706,839 B2 * | 4/2010 | Ueno | ........................... | 455/558 |
| 2002/0154632 A1 * | 10/2002 | Wang et al. | ................... | 370/389 |
| 2006/0291455 A1 * | 12/2006 | Katz et al. | ..................... | 370/355 |
| 2007/0123305 A1 * | 5/2007 | Chen et al. | .................... | 455/558 |
| 2008/0020773 A1 * | 1/2008 | Black et al. | ................... | 455/445 |
| 2008/0064443 A1 * | 3/2008 | Shin et al. | ..................... | 455/558 |
| 2008/0081668 A1 * | 4/2008 | Naruse et al. | ................. | 455/558 |
| 2008/0161050 A1 * | 7/2008 | Shudark et al. | ............... | 455/558 |
| 2009/0029736 A1 * | 1/2009 | Kim et al. | ..................... | 455/558 |
| 2009/0061932 A1 * | 3/2009 | Nagarajan | .................... | 455/558 |
| 2009/0163240 A1 * | 6/2009 | Ryu et al. | .................. | 455/553.1 |

FOREIGN PATENT DOCUMENTS

EP 1519278 A1 * 3/2005

* cited by examiner

*Primary Examiner* — Anthony Addy

(74) *Attorney, Agent, or Firm* — Jefferson IP Law, LLP

(57) ABSTRACT

A multiple mode multiple standby mobile terminal and self configuration method of the mobile terminal are provided for automatically configuring settings on multiple Subscriber Identity Module (SIM) cards. An identity module configuration method for a multiple mode multiple standby mobile terminal includes checking, when the mobile terminal powers on, reference identity information in the mobile terminal, determining whether identity information contained in an identity card attached to the mobile terminal is included in the reference identity information and establishing, when the identity information is included in the reference identity information, a connection to a communication network indicated by the identity information.

13 Claims, 6 Drawing Sheets

MULTIMODE MOBILE TERMINAL AND SELF-SIM CONFIGURATION METHOD THEREOF

PRIORITY

This application claims the benefit under 35 U.S.C. §119(a) of a Korean patent application filed in the Korean Intellectual Property Office on Oct. 19, 2007 and assigned Serial No. 2007-0105376, the entire disclosure of which is hereby incorporated by reference.

BACKGROUND OF THE INVENTION

1. Field of the Invention

The present invention relates to a multiple mode mobile terminal. More particularly, the present invention relates to a multiple mode multiple standby mobile terminal and self configuration method for the mobile terminal that is capable of configuring settings on multiple Subscriber Identity Module (SIM) cards.

2. Description of the Related Art

A Subscriber Identity Module (SIM) card is an integrated circuit-embedded smart card designed for use in a Global System for Mobile communications (GSM) system and a Wideband Code Division Multiple Access (WCDMA) system. A SIM card contains information about the subscriber, such as the subscriber's phone number, and information about the network provider.

Typically, conventional SIM-based dual mode mobile terminals are provided with a single card slot for receiving a SIM card. In such a dual mode mobile terminal, when a user is receiving communication service through a first network and desires to receive communication service through another network, the user must replace the current SIM card, associated with the first network, with another one for receiving communication services through the other network. The SIM card must also be replaced if the user desires to receive service with another phone number rather than current phone number.

In order to solve this inconvenience, a dual mode dual standby mobile terminal that can accommodate two SIM cards simultaneously has been introduced. The dual mode dual standby mobile terminal is advantageous since it allows two SIM cards to work simultaneously without needing to replace a SIM card for changing the network or phone number. For this reason, the demand for dual mode dual standby mobile terminals is increasing.

However, the conventional dual mode dual standby mobile terminal has a drawback in that a user must configure settings on each of the SIM cards inserted in the respective card slots whenever the mobile terminal powers on. Furthermore, the per-SIM card configuration causes boot-up time delay of the mobile terminal, resulting in user inconvenience.

SUMMARY OF THE INVENTION

An aspect of the present invention is to address at least the above-mentioned problems and/or disadvantages and to provide at least the advantages described below. Accordingly, an aspect of the present invention is to provide a multiple mode multiple standby mobile terminal and self-configuration method for the multiple mode multiple standby mobile terminal that is capable of configuring settings on multiple Identity cards automatically.

In accordance with an exemplary embodiment of the present invention, an identity module configuration method for a multiple mode multiple standby mobile terminal is provided. The method includes checking, when the mobile terminal powers on, reference identity information in the mobile terminal, determining whether identity information contained in an identity card attached to the mobile terminal is included in the reference identity information and establishing, when the identity information is included in the reference identity information, a connection to a communication network indicated by the identity information.

In accordance with another exemplary embodiment of the present invention, a mobile terminal is provided. The mobile terminal includes a radio frequency unit supporting radio communication with at least two different mobile communication systems, a card reception unit having at least two card slots for receiving at least one identity card, a storage unit for storing reference identity information to be compared with identity information contained in the at least one identity card and a control unit for checking, when the mobile terminal powers on, the reference identity information, for determining whether identity information contained in an identity card attached to the mobile terminal is included in the reference identity information, and for establishing, when the identity information is included in the reference identity information, a connection to a communication network indicated by the identity information.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features and advantages of certain exemplary embodiments of the present invention will be more apparent from the following description taken in conjunction with the accompanying drawings, in which.

Throughout the drawings, it should be noted that like reference numbers are used to depict the same or similar elements, features and structures.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. Also, descriptions of well-known functions and constructions are omitted for clarity and conciseness.

Figure 1:
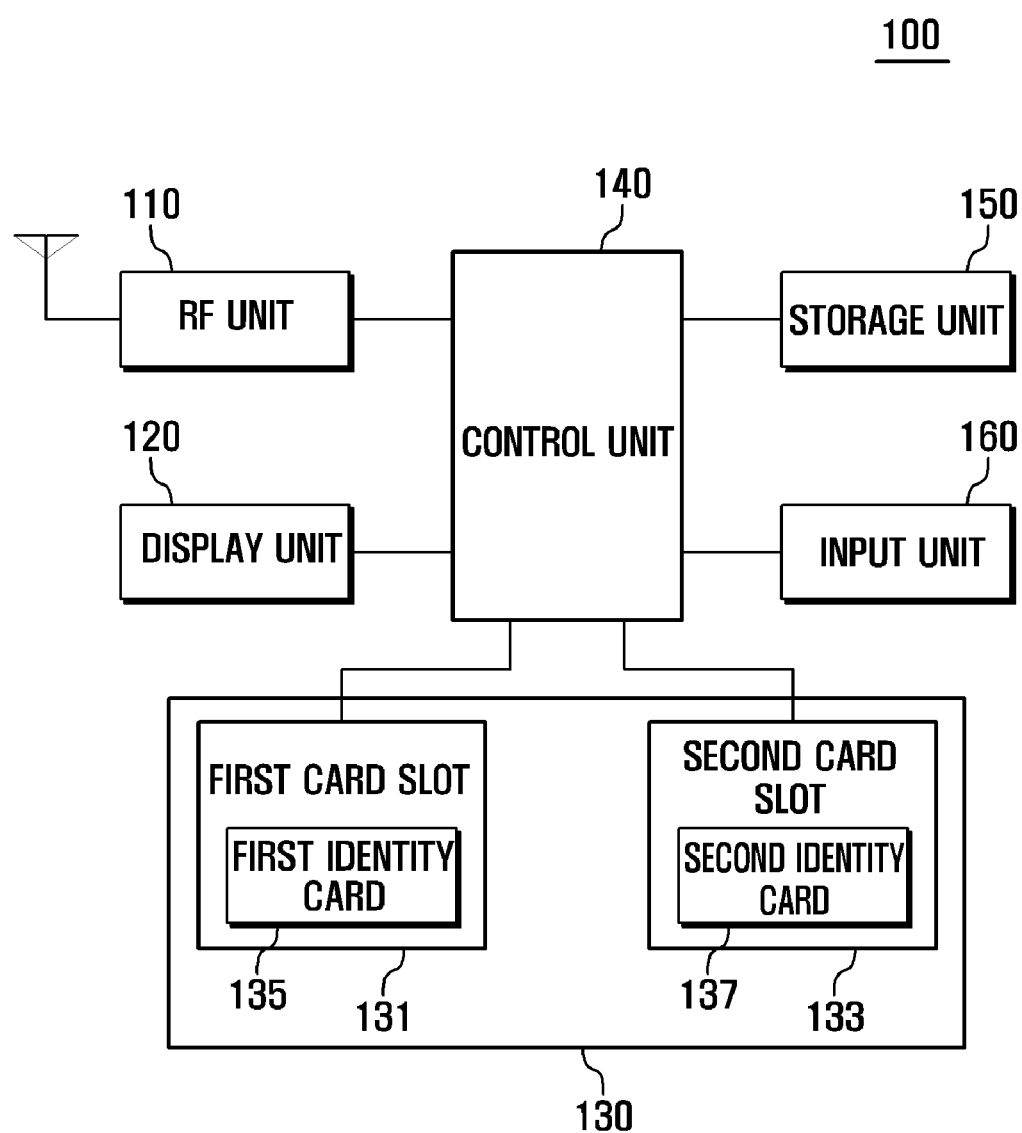
FIG. 1 is a block diagram illustrating a configuration of a mobile terminal according to an exemplary embodiment of the present invention.

FIG. 1 is a block diagram illustrating a configuration of a mobile terminal according to an exemplary embodiment of the present invention.

As shown in FIG. 1, the mobile terminal 100 is a dual mode dual standby mobile phone having two card slots capable of having mounted therein two Identity cards simultaneously. Of course, it is to be noted that the illustration of two Identity cards is merely for purpose of explanation and that the present invention is not limited thereto. For example, the mobile terminal can be implemented as a multiple mode multiple standby mobile terminal having more than two card slots.

Referring to FIG. 1, the mobile terminal 100 includes a Radio Frequency (RF) unit 110, a display unit 120, a card reception unit 130, a control unit 140, a storage unit 150, and an input unit 160.

The RF unit 110 is responsible for radio communication of the mobile terminal with a base station. The RF unit 110 may include a duplexer for separating transmission and reception signals, a transmitter for up-converting the transmission signal, and a receiver for down-converting the reception signal. In an exemplary implementation, the RF unit 110 may be configured to communicate using either a CDMA or a GSM system under the control of the control unit 140.

The display unit 120 displays operation status and configuration information of the mobile terminal. The display unit 120 can be implemented with a Liquid Crystal Display (LCD). In a case of using a touchscreen-enabled LCD having a dedicated controller, memory, and LCD devices, the display unit 120 can act as a part of or in place of the input unit 160. In an exemplary embodiment, the display unit 120 is configured to display a reference identity information settings screen which allows a user to configure reference identity information. As will be described below, the reference identity information may be compared with per-card identity information provided by the Identity cards mounted on the card reception unit 130 under the control of the control unit 140.

The card reception unit 130 is provided with a first card slot 131 and a second card slot 133 for receiving first and second Identity cards 135 and 137. Here, each of the first and second Identity cards 135 and 137 contains subscriber information, a phone number, network operator information, network information and the like. Although the card reception unit 130 is illustrated as having two card slots in FIG. 1, the number of card slots can be changed according to the configuration of the mobile terminal.

The control unit 140 controls the operations of the mobile terminal 100 and specifically controls the internal components to cooperate with one another. Particularly, the control unit 140 controls the storage unit 150 to save the reference identity information from the first and second card slots 131 and 133 set by the user. Accordingly, when the Identity cards are again inserted to the first and second card slots 131 and 133, the control unit 140 checks the identity information contained in the respective identity cards 135 and 137 and determines if the per-card identity information is included in the reference identity information stored in the storage unit 150.

The storage unit 150 stores programs for execution of various functions of the mobile terminal 100 and stores data generated while the mobile terminal operates. In an exemplary embodiment, the storage unit 150 stores the reference identity information configured in association with the first and second card slots 131 and 133 under control of the control unit 140. Here, the reference identity information may include types of Identity cards available, that is, the available types of networks, network operator information and the like.

The input unit 160 is provided with a plurality of alphanumeric keys for inputting alphanumeric information and function keys for executing various functions. The function keys can be implemented in the form of navigation keys, side keys, shortcut keys, soft keys and the like.

The control unit 140 stores the reference identity information associated with Identity cards to be inserted into the first and second card slots 131 and 133 within the storage unit 150. The reference identity information may be stored in advance such that, when the mobile terminal 100 is turned on, the control unit 140 compares the reference identity information stored in the storage unit 150 with the per-card identity information contained in the first and second cards 135 and 137 and boots up the mobile terminal 100 based on the comparison result.

Figure 2:
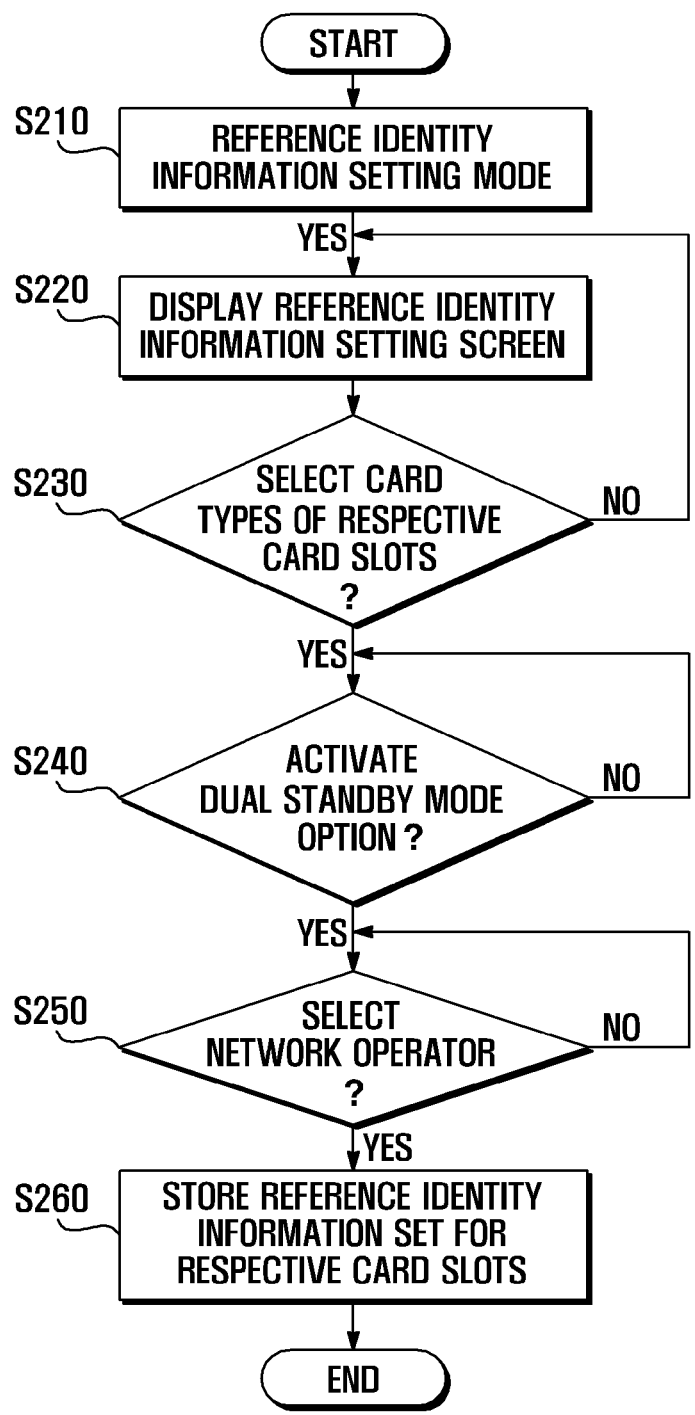
FIG. 2 is a flowchart illustrating a reference identity information setting procedure of a self-SIM configuration method according to an exemplary embodiment of the present invention.
Figure 3:
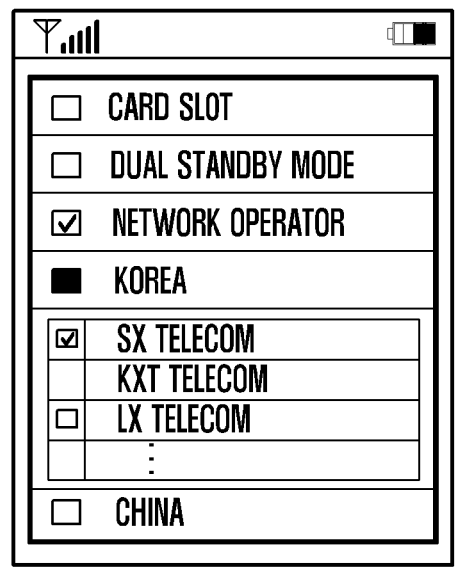
FIG. 3 is a screen image illustrating a step of displaying a reference identity information setting screen in the reference identity information setting procedure of FIG. 2.

FIG. 2 is a flowchart illustrating a reference identity information setting procedure of a self-SIM configuration method according to an exemplary embodiment of the present invention. FIG. 3 is a screen image illustrating a step of displaying a reference identity information setting screen in the reference identity information setting procedure of FIG. 2, FIG. 4 is a screen image illustrating a step of configuring types of cards to be inserted into card slots in the reference identity information setting procedure of FIG. 2, FIG. 5 is a screen image illustrating a step of selecting dual standby mode in the reference identity information setting procedure of FIG. 2, and FIG. 6 is a screen image illustrating a step of selecting network operators in the reference identity information setting procedure of FIG. 2.

Referring to FIGS. 2 to 6, the control unit 140 of the mobile terminal 100 detects an input for setting reference identity information in step S210. The reference identity information may also be referred to as card slot information. In an exemplary implementation, the reference identity information setting input may be made through menu navigation or function key manipulation. Once the card slot setting input is detected, the control unit 140 activates a card slot setting mode and controls the display unit 120 to display a reference identity information setting screen, as illustrated in FIG. 3, in step S220. Here, the reference identity information may include available types of networks, a dual standby mode option, network operators and the like.

Figure 4:
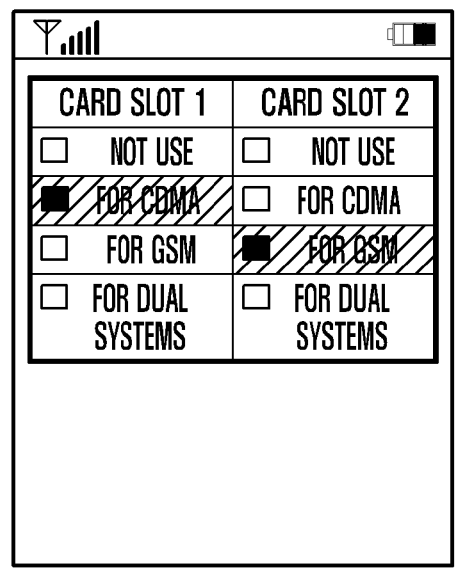
FIG. 4 is a screen image illustrating a step of configuring types of cards to be inserted into card slots in the reference identity information setting procedure of FIG. 2.

In step S230, the control unit 140 determines whether the types of identity cards are selected for the respective card slots as illustrated in FIG. 4. That is, the control unit 140 determines if the user inputs the type of card that is located in a respective card slot. Typically, the types of cards include a SIM card for a GSM system, a Reusable User Identity Card (RUID) for a CDMA system, a Universal SIM (USIM) card for a Universal Mobile Telecommunications System (UMTS), and a Dual card supporting both the GSM and CDMA systems. If the user has decided to use the first and second card slots 131 and 133 for CDMA and GSM cards respectively, the CDMA use option is selected for the first card slot and the GSM use option is selected for the second card slot as illustrated in FIG. 4.

Figure 5:
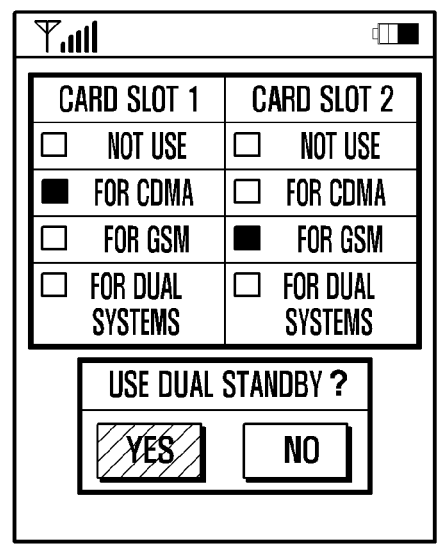
FIG. 5 is a screen image illustrating a step of selecting dual standby mode in the reference identity information setting procedure of FIG. 2.
Figure 6:
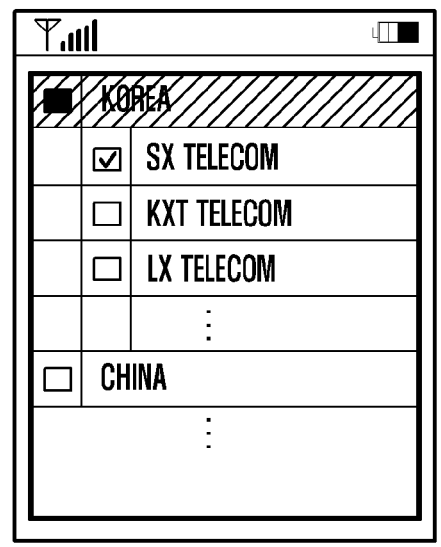
FIG. 6 is a screen image illustrating a step of selecting network operators in the reference identity information setting procedure of FIG. 2.

After the types of Identity cards are set for the first and second card slots, the control unit 140 determines in step S240 whether an input is made for activating a dual standby mode option as illustrated in FIG. 5. The input may be made by a key input through the input unit 160. In the case that the dual standby mode option is activated, the mobile terminal 100 can be used in the two types of mobile communication networks, i.e. GSM and CDMA communication networks.

If the dual standby mode is activated, the control unit 140 determines in step S250 whether an input is received for selecting a network operator as illustrated in FIG. 6. In an exemplary embodiment, the input may be made by a key input through the input unit 160. The network operator selection process may be omitted according to the service policies of mobile terminal manufacturers and network operators.

If a network operator is selected, the control unit 140 displays the reference identity information according to the user selection and stores the reference identity information in the storage unit 150 in step S260. That is, the control unit 140 stores the information on types of Identity cards, dual standby mode activation option, and selected network operator within the storage unit 150.

An exemplary method for booting the mobile terminal 100 using the reference identity information is described hereinafter.

Figure 7:
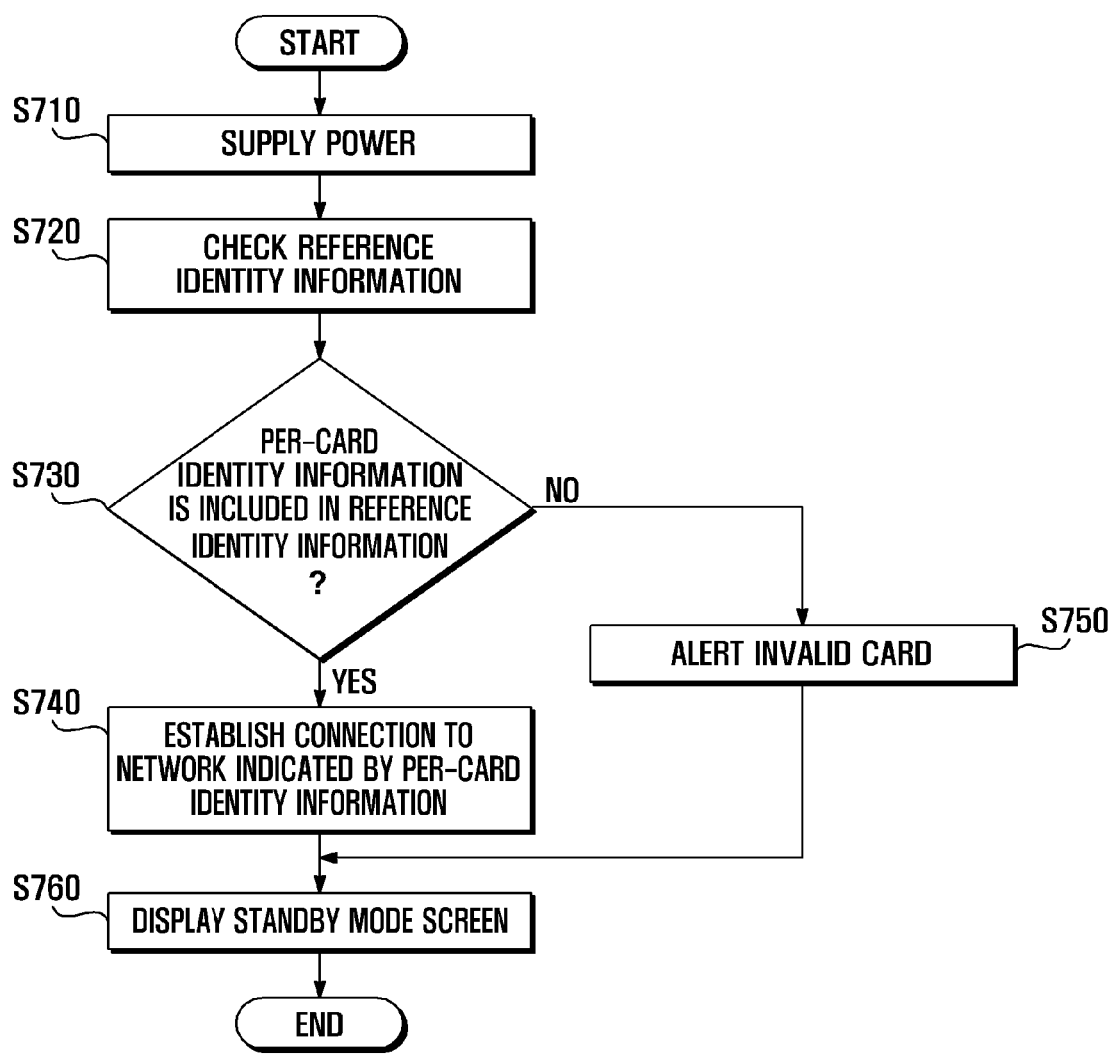
FIG. 7 is a flowchart illustrating a booting procedure of a self-SIM configuration method according to an exemplary embodiment of the present invention.

FIG. 7 is a flowchart illustrating a booting procedure of a self-SIM configuration method according to an exemplary embodiment of the present invention. The booting procedure is performed with the above-described reference identity information.

Referring to FIG. 7, if a power-on input is detected, the control unit 140 controls to supply power to the internal components of the mobile terminal 100 in step S710. In step S720, the control unit 140 checks the reference identity information stored in the storage unit 150. In step S730, the control unit 140 determines whether the identity information contained in each of the Identity cards inserted in the card slots is included in the reference identity information stored in the storage unit 150. That is, the control unit 140 determines if the information contained in each of the Identity cards matches the respective information stored in the storage unit 150.

If the per-card identity information contained in the Identity cards is included in the reference identity information, the control unit 140 attempts to establish a connection with a communication network indicated by the reference identity information in step S740. Once the network connection is established, the control unit 140 controls to display a standby mode screen on the display unit 120 in step S760. For example, if the reference identity information in storage unit 150 includes the settings on the first card slot with the "CDMA use" option, the control unit 140 reads out the settings from the Identity card in the first card slot at the beginning of the booting process and determines whether the Identity card inserted in the first card slot is a CDMA RUID card. If it is determined that a CDMA RUID card is inserted in the first card slot, the control unit 140 controls the RF unit 110 to establish a connection with the CDMA communication network and controls such that the mobile terminal 100 enters the CDMA idle mode while displaying a standby mode screen. At this time, if the reference identity information and card information contain the network operator option, the control unit 140 controls the RF unit 110 to establish a connection with the CDMA network of the network operator indicated by the network operator option.

On the other hand, if the identity information contained in the Identity card mounted in the card reception unit 130 is not included in the reference identity information stored in storage unit 150, the control unit 140 controls the display unit 120 to display a message notifying that the attached Identity card is not identical with any of available Identity cards indicated by the reference identity information in step S750.

Until now, the reference identity information configuration procedure and terminal boot up procedure using the reference identity information configured in the reference identity information configuration procedure have been described. An exemplary method for performing SIM configuration will now be described with reference to FIG. 8.

Figure 8:
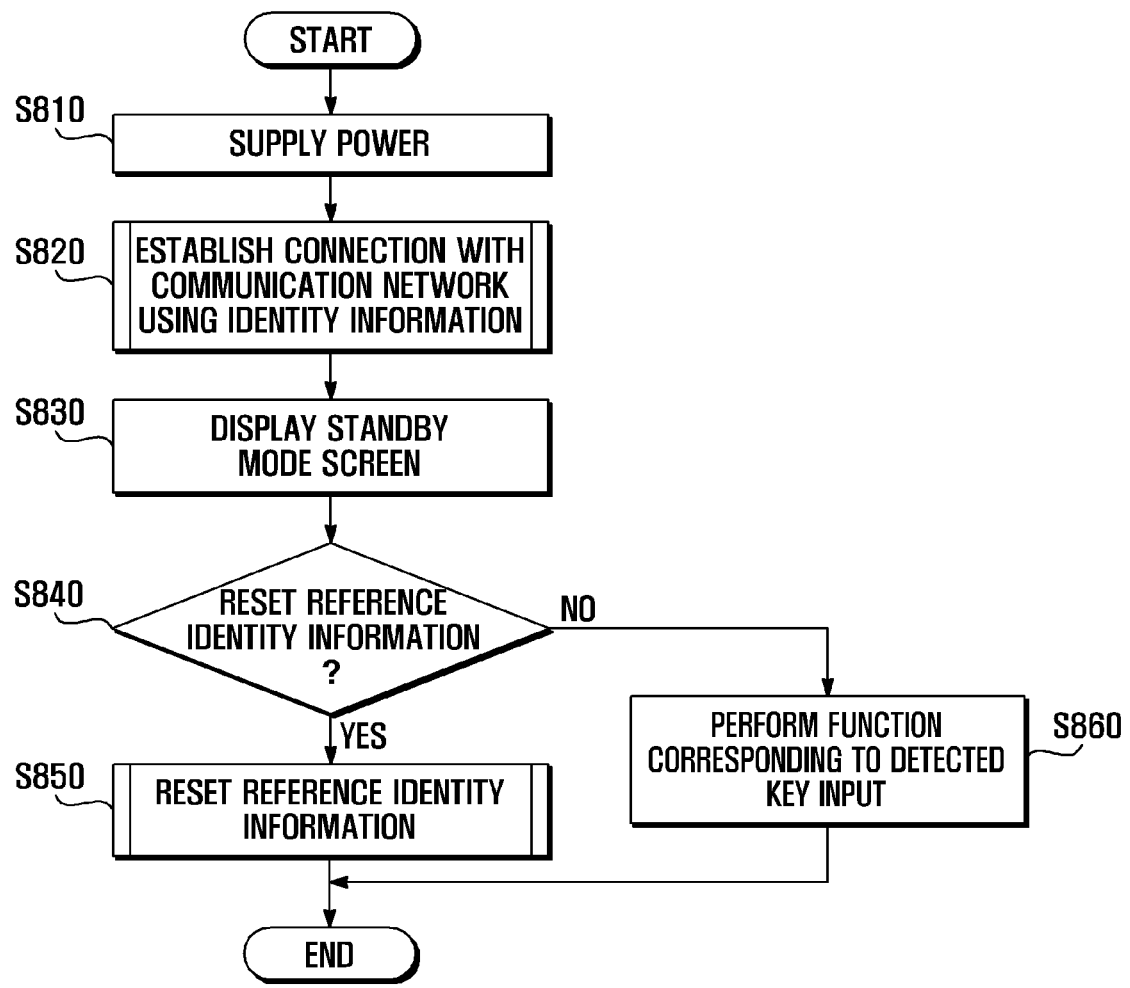
FIG. 8 is a flowchart illustrating a SIM configuration procedure of a self-SIM configuration method according to an exemplary embodiment of the present invention.

FIG. 8 is a flowchart illustrating a SIM configuration procedure of a self-SIM configuration method according to an exemplary embodiment of the present invention.

Referring to FIG. 8, if a power-on input is detected, the control unit 140 controls to supply power to the internal components of the mobile terminal 100 and starts booting the mobile terminal 100 in step S810. During the booting process, the control unit 140 controls to establish a connection to a communication network using the reference identity information in step S820 and complete the booting process with a standby screen displayed on the display unit 120 in step S830. The connection establishment step S820 is performed using a process substantially identical with steps S720 to S750 of FIG. 7, and thus detailed description of step S820 is omitted. In short, the control unit 140 reads out the reference identity information from the storage unit 150 at step S720, determines whether the identity information contained in the attached Identity card is included in the reference identity information at step S730, establishes, if the identity information contained in the attached Identity card is included in the reference identity information, connection with a communication network indicated by the reference identity information, and displays, if the identity information contained in the Identity card mounted in the card reception unit 130 is not included in the reference identity information, a message notifying that the attached Identity card is not identical with any of available Identity cards indicated by the reference identity information at step S750.

Next, the control unit 140 determines whether a reference identity information setting input is detected in step S840. If a reference identity information setting input is detected, the control unit 140 starts a reference identity information setting process in step S850. Here, the reference identity information setting step S850 is performed using a process substantially identical with steps S210 to S260 of FIG. 2, and thus detailed description of step S850 is omitted. In short, the control unit 140 detects a reference identity information setting input at step S210, displays, if the card slot setting input is detected, a reference identity information setting screen at step S220, checks the reference identity information input through the reference identity information setting screen at steps S230 to 250, and stores the reference identity information in the storage unit 150.

If the input detected at step S840 is not for setting the reference identity information, the control unit 140 performs a function corresponding to the detected input in step S860.

Although exemplary embodiments of the present invention have been described in detail hereinabove, it should be clearly understood that many variations and/or modifications of the basic inventive concepts herein taught which may appear to those skilled in the present art will still fall within the spirit and scope of the present invention, as defined in the appended claims and their equivalents.

As described above, the multiple mode mobile terminal and self-SIM configuration method of the multiple mode mobile terminal according to exemplary embodiments of the present invention enables configuring Identity card settings automatically when the mobile terminal powers on, resulting in reduction of booting delay. Also, the self-SIM configuration method of exemplary embodiments of the present invention enables the mobile terminal to configure the Identity card settings without user manipulation, resulting in greater user convenience.

What is claimed is:

1. An identity module configuration method for a multiple mode multiple standby mobile terminal, the method comprising:
   checking, when the mobile terminal powers on, reference identity information of at least one card slot in the mobile terminal;
   determining whether identity information contained in an identity card attached to the mobile terminal is included in the reference identity information of the at least one card slot in the mobile terminal; and
   establishing, when the identity information contained in the identity card attached to the mobile terminal is included in the reference identity information of the at least one card slot in the mobile terminal, a connection to a communication network indicated by the identity information contained in the identity card and the reference identity information of the at least one card slot.

2. The method of claim 1, wherein the identity information comprises at least one of a network type and a network operator.

3. The method of claim 1, wherein the reference identity information comprises at least one of a network type, a dual standby mode option, and a network operator.

4. The method of claim 2, further comprising displaying, when the identity information is not included in the reference identity information, a message notifying that the identity card is invalid.

5. The method of claim 1, further comprising determining if the reference identity information is to be reset.

6. The method of claim 5, further comprising:
   if it is determined that the reference identity information is to be reset, displaying a reference identity information setting screen in response to an identity module settings input;
   highlighting one or more options selected on the reference identity information settings screen in response to selection inputs; and
   storing information corresponding to the selected one or more options as the reference identity information.

7. The method of claim 6, wherein the reference identity information comprises at least one of a network type, a dual standby mode option, and a network operator.

8. The method of claim 7, wherein the network type comprises at least one of a Code Division Multiple Access (CDMA) system, a Universal Mobile Telecommunications System (UMTS) and a General System for Mobile communications (GSM).

9. The method of claim 5, further comprising, if it is determined that the reference identity information is not to be reset, performing a function corresponding to an input selection.

10. The method of claim 1, further comprising displaying a standby screen after the establishing of the connection to the communication network indicated by the identity information.

11. The method of claim 1, wherein the determining of whether identity information contained in an identity card attached to the mobile terminal is included in the reference identity information comprises determining whether identity information contained in at least two identity cards attached to the mobile terminal is included in the reference identity information.

12. A mobile terminal comprising:
   a radio frequency unit for supporting radio communication with at least two different mobile communication systems;
   a card reception unit comprising at least two card slots for receiving at least one identity card;
   a storage unit for storing reference identity information of the at least two card slots in the mobile terminal to be compared with identity information contained in the at least one identity card; and
   a control unit for checking, when the mobile terminal powers on, the reference identity information of at least one of the at least two card slots in the mobile terminal, for determining whether identity information contained in an identity card attached to the mobile terminal is included in the reference identity information of the at least one of the at least two card slots in the mobile terminal, and for establishing, when the identity information contained in the identity card attached to the mobile terminal is included in the reference identity information of the at least one of the at least two card slots in the mobile terminal, a connection to a communication network indicated by the identity information contained in the identity card and the reference identity information of the card slot.

13. The mobile terminal of claim 12, further comprising a display unit, wherein the control unit controls to display, when the identity information is not included in the reference identity information, a message notifying that the identity card is invalid.

* * * * *